United States Patent [19]

Shekleton et al.

[11] Patent Number: 5,577,380

[45] Date of Patent: Nov. 26, 1996

[54] COMPACT GAS TURBINE ENGINE

[75] Inventors: Jack R. Shekleton; Melvin K. Lafferty, both of San Diego, Calif.

[73] Assignee: Sundstrand Corporation, Rockford, Ill.

[21] Appl. No.: 383,911

[22] Filed: Feb. 6, 1995

Related U.S. Application Data

[63] Continuation of Ser. No. 885,915, May 18, 1992, Pat. No. 5,254,354, which is a continuation of Ser. No. 686,038, Apr. 16, 1991, Pat. No. 5,140,808, which is a continuation of Ser. No. 324,688, Mar. 17, 1989, Pat. No. 5,033,263.

[51] Int. Cl.$^6$ ............................................ F02C 3/05
[52] U.S. Cl. ............................................ 60/39.36
[58] Field of Search ........................ 60/39.32, 39.36, 60/752, 755, 757, 759, 760

[56] References Cited

U.S. PATENT DOCUMENTS 3,383,855  5/1968  Freeman et al. ........................ 60/757

*Primary Examiner*—Timothy S. Thorpe

[57] ABSTRACT

A gas turbine engine 10 having a rotor 12 with turbine blades 14 and a nozzle 16 adjacent the turbine blades 14 for directing hot gases of combustion at the turbine blades 14. The engine 10 also includes an annular combustor 18 about the rotor 12 and an annular combustor housing 30 substantially surrounding the combustor 18 in generally concentric spaced relation. A fuel injection system is operatively associated with the combustor 18 for injecting fuel into a combustion space 28 to be combusted with air from a compressor 34. The fuel injection system may include a plurality of circumferentially spaced fuel injectors 68 disposed in an outer wall 20 of the combustor 18 together with a generally oval shaped manifold 70 in fluid communication with a primary fuel source and the fuel injectors 68. A turbine shroud 36 is provided to extend radially outward from the rotor to the outer wall of the combustor on the side of the nozzle 16 opposite the combustion space 28. The turbine shroud 36 is cooled by a film of air which passes through a plurality of circumferentially spaced orifices 40 in the outer wall 20 of the combustor 18. The engine 10 also includes an abutment member 38, 60 and a spacing member 66 between the combustor 18 and the housing 30. With this arrangement, the combustor 18 and the housing 30 can be maintained in generally concentric preselected axial relation.

3 Claims, 2 Drawing Sheets

FIG. I

COMPACT GAS TURBINE ENGINE

This is a continuation of application Ser. No. 07/885,915 filed May 18, 1992, now U.S. Pat. No. 5,254,354, which is a continuation of application Ser. No. 07/686,038 filed Apr. 16, 1991, now U.S. Pat. No. 5,140,808, which is a continuation of application Ser. No. 07/324,688 filed Mar. 17, 1989, now U.S. Pat. No. 5,033,263.

FIELD OF THE INVENTION

This invention relates to gas turbine engines and, more particularly, to a compact gas turbine engine arrangement.

BACKGROUND OF THE INVENTION

It has long been known in gas turbines to provide a dilution air zone in the combustor immediately downstream of the flame zone. The dilution air zone is conventionally located directly within the combustion annulus downstream of the fuel injectors but well upstream of the outlet of the combustor. Generally speaking, dilution air is injected into the combustion annulus for the purpose of controlling the temperature of hot gases.

With such arrangements, upstream of the dilution air zone both fuel and air are injected and ignited in the combustion annulus. It is also conventional for there to be a cooling air film introduced along the walls of the combustion annulus upstream of the dilution air zone. Of course, the hot gases that result from combustion of fuel and air then pass on toward the turbine blades.

As is known, it is important to be able to control the temperature of the hot gases as they enter the nozzle on their way to the turbine blades. This has conventionally been handled by injecting the dilution air into the hot gases in an effort to ensure thorough mixing and cooling prior to entry into the nozzle. While effective, this means of controlling the temperature of the hot gases is not entirely satisfactory in every respect.

More particularly, the need to provide the dilution air zone in the combustion annulus upstream of the outlet of the combustor tends to dictate the geometry. In other words, the length of the turbine is controlled to a significant degree by the necessity of having a distinct dilution air zone within a combustion annulus, i.e., there has been no available manner for satisfactorily shortening the length of the combustor, much less the diameter thereof, in order to reduce weight and expense. However, conventional designs have also failed to address still another serious problem recognized by those in this field.

In particular, the dilution air flow path is known to cool only a portion of the walls of the combustor. Thus, in a conventional annular combustor of a gas turbine, not only is it true that not all portions of the walls of the combustor are cooled by the dilution air, but the point of injection into the dilution air zone has rendered it impossible to effect any significant cooling of the turbine shroud or shrouds and, thus, of the nozzle and turbine blades. As a result, it has remained to provide a low cost, simple, reliable means of turbine shroud cooling.

In addition, there has been a need for a simple means of positioning a combustor in generally concentric preselected axial relation to a housing without the need for a fixed attachment therebetween. It will be appreciated that such an arrangement would be desirable not only because of a reduction in expense in terms of parts and assembly but also because it would permit the overall diameter of the combustor and housing to be reduced thereby further reducing weight and expense without any adverse effect on the performance of the gas turbine engine. For this reason, it has remained to provide a suitable manner for satisfactorily reducing the diameter of the combustor and housing while at the same time providing automatic positioning therebetween.

Still additionally, it would be desirable to provide a plurality of fuel injectors in circumferentially spaced relation in the outer wall of a combustor. However, inasmuch as the space between the housing and the combustor must typically be used as an air flow path, there has been no suitable manner of directing fuel to such an arrangement of fuel injectors without unnecessarily impeding the flow of dilution air. As a result, it has remained to provide a low cost, simple, reliable means of fuel injection.

The present invention is directed to overcoming the above stated problems by providing a unique compact gas turbine engine characterized by automatic combustor positioning, turbine shroud cooling, and circumferential fuel injection. While the invention has been described in connection with a radial flow turbine, it should be appreciated that the invention could be utilized with any gas turbine construction.

SUMMARY OF THE INVENTION

It is a principal object of the invention to provide a new and improved compact gas turbine engine construction. More specifically, it is an object of the invention to provide such a gas turbine engine wherein a combustor is automatically self locating within a housing and the engine achieves a simple yet reliable degree of turbine shroud cooling. Furthermore, it is an object of the invention to provide an entirely satisfactory means of fuel injection.

An exemplary embodiment of the invention achieves the foregoing objects in a gas turbine engine including a rotor having turbine blades and a nozzle adjacent the turbine blades which is adapted to direct hot gases at the turbine blades to cause rotation of the rotor. The gas turbine engine includes an annular combustor about the rotor defined by spaced inner and outer walls connected by a radially extending wall. The combustor has an outlet leading to the nozzle and includes an annular combustion space upstream of the outlet defined by the inner, outer and radially extending walls. The gas turbine engine also includes an annular combustor housing substantially surrounding the combustor in generally concentric spaced relation to the inner, outer and radially extending walls. The housing together with the combustor defines an air flow path therebetween in fluid communication with a compressor and with the combustor to permit air from the compressor to be injected into the combustion space. The gas turbine engine further includes fuel injection means operatively associated with the combustor for injecting fuel from a primary fuel source into the combustion space. With this arrangement, the combustor is adapted to combust fuel from the primary fuel source and air from the compressor to generate the hot gases of combustion.

In one aspect of the invention, a turbine shroud extends radially outward from the rotor to the outer wall of the combustor on the side of the nozzle opposite the combustion space. The outer wall of the combustor has a plurality of circumferentially spaced orifices positioned to direct a film of air onto the turbine shroud. Preferably, the outer wall of the combustor includes a stiffening ring adjacent the turbine shroud through which the orifices extend.

With this arrangement, the orifices allow air to flow through the outer wall and the stiffening ring to produce the film of air on the turbine shroud. This film of air cools the turbine shroud which is preferably disposed in a plane extending perpendicular to an axis of the rotor. To maximize the cooling of the turbine shroud, the orifices are advantageously disposed axially adjacent the turbine shroud radially outwardly of the nozzle.

In another aspect of the invention, the fuel injection means includes a plurality of circumferentially spaced fuel injectors disposed in the outer wall of the combustor. A generally oval shaped manifold is disposed in the air flow path between the outer wall of the combustor and the housing. In addition, the manifold is in fluid communication with a primary fuel source and the fuel injectors to permit fuel to be injected into the combustion space.

Preferably, the fuel injectors each comprise a tube having an air inlet at one end, a fuel/air outlet at the other end, and a fuel inlet intermediate the air inlet and fuel/air outlet. The air inlets are each in fluid communication with the air flow path between the outer wall of the combustor and the housing and the fuel/air outlets are each in fluid communication with the combustion space in axially spaced relation at opposite ends of the generally cylindrical tubes comprising the fuel injectors. Still further, the fuel inlets each preferably comprise a radial opening in each of the tubes in fluid communication with a fuel metering orifice in the manifold to receive a radially projecting jet of fuel from the primary fuel source.

In still another aspect of the invention, the housing includes a pair of spaced apart turbine shrouds disposed relative to one another so as to define the nozzle and to cover the turbine blades. The one of the turbine shrouds nearest the combustor, together with the remainder of the housing and the inner, outer and radially extending walls, then advantageously define a dilution air flow path extending from a compressed air inlet in communication with a source of dilution air to a compressed air outlet. With this arrangement, the compressed air outlet is disposed adjacent the outlet of the combustor and adjacent the nozzle at the end of the dilution air flow path remote from the compressed air inlet.

In the exemplary embodiment, means are provided for positioning the combustor within the housing including abutment means between the combustor and the housing for maintaining them in preselected axial relation. The abutment means, which preferably includes an annular stiffening ring on an inner surface of the outer wall of the combustor, is adapted to contact the one of the shrouds furthest from the combustor. Furthermore, the positioning means also includes spacing means disposed between the combustor and the housing for maintaining the combustor and the housing in generally concentric relation.

With regard to the abutment means, the one of the turbine shrouds furthest from the combustor preferably has an axial engagement surface extending generally perpendicular to an axis of the rotor to an outer edge at a point radially outwardly of the nozzle. The stiffening ring will then be adapted to axially engage the engagement surface of that turbine shroud adjacent the outer edge thereof to limit relative axial movement between the combustor and the housing. Also, the abutment means may include a plurality of vanes disposed between the one of the turbine shrouds nearest the combustor and the inner wall of the combustor adjacent the compressed air outlet.

As for the spacing means, it may advantageously include a plurality of vanes disposed between the combustor and the housing in the dilution air flow path intermediate the compressed air inlet and the compressed air outlet. The vanes are preferably disposed in circumferentially spaced relation between the inner wall of the combustor and the housing at an angle corresponding to an angle of swirl of air in the dilution air flow path. Still further, the vanes are advantageously fixed to only one of the inner wall of the combustor and the housing to maintain concentricity while accommodating limited relative axial movement between the combustor and the housing.

Other objects, advantages and features of the present invention will become apparent from a consideration of the following specification taken in conjunction with the accompanying drawings.

IN THE DRAWINGS

DETAILED DESCRIPTION OF THE PREFERRED EMBODIMENT

Figure 1:
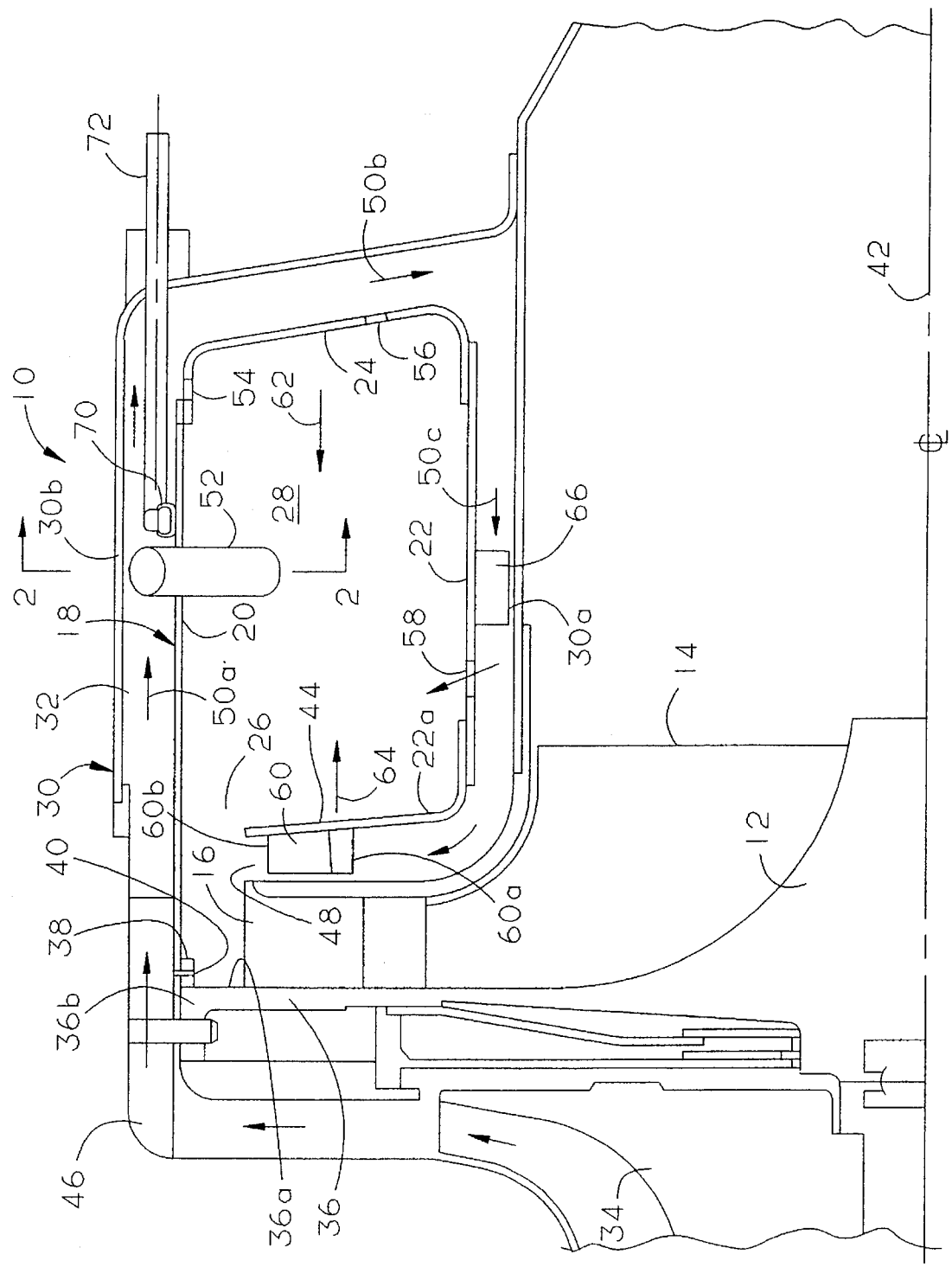
FIG. 1 is a partially schematic, partially sectional view of a compact gas turbine engine in accordance with the present invention.

Referring to the drawings, and first to FIG. 1, the reference numeral 10 designates generally a compact gas turbine engine having a rotor 12 with turbine blades 14 and a nozzle 16 adjacent the turbine blades 14 for directing hot gases of combustion at the turbine blades 14. The gas turbine engine 10 also includes an annular combustor generally designated 18 about the rotor 12 defined by spaced inner and outer walls 20 and 22 connected by a radially extending wall 24. The combustor 18 has an outlet 26 leading to the nozzle 16 and includes an annular combustion space 28 upstream of the outlet 26 defined by the inner, outer and radially extending walls 20, 22 and 24. The gas turbine engine 10 also includes an annular combustor housing generally designated 30 substantially surrounding the combustor 18 in generally concentric spaced relation to the inner, outer and radially extending walls 20, 22 and 24. With this arrangement, the housing 30 and combustor 18 together define an air flow path 32 therebetween which is in fluid communication with a compressor 34 and with the combustor 18 to permit air from the compressor 34 to be injected into the combustion space 28.

Still referring to FIG. 1, the gas turbine engine 10 includes a turbine shroud 36 extending radially outward from the rotor 12 to the outer wall 20 of the combustor 18 on the side of the nozzle 16 opposite the combustion space 28. The outer wall 20 of the combustor 18 preferably includes a stiffening ring 38 adjacent the turbine shroud 36 and has a plurality of circumferentially spaced orifices 40 which then extend through not only the outer wall 20 but also the stiffening ring 38 to allow air to flow therethrough to direct a film of air onto the turbine shroud 36 for cooling purposes. As shown, the turbine shroud 36 is disposed in a plane extending perpendicular to an axis 42 of the rotor 12 with the orifices 40 being disposed axially adjacent the turbine shroud 36 and radially outwardly of the nozzle 16.

In the preferred embodiment, the housing 30 includes a pair of spaced apart turbine shrouds 36 and 44 disposed relative to one another so as to define the nozzle 16 and to cover the turbine blades 14. The one of the turbine shrouds 44 nearest the combustor 18, together with the remainder of the housing 30 and the inner, outer and radially extending walls 20, 22 and 24, define a dilution air flow path, i.e., the air flow path 32, extending from a compressed air inlet 46 in communication with the compressor 34 (which is a source of dilution air) to a compressed air outlet 48. With this arrangement, the compressed air outlet 48 is disposed adjacent the outlet 26 of the combustor 18 and the nozzle 16 at the end of the dilution air flow path 32 remote from the compressed air inlet 46.

As shown in FIG. 1, the dilution air flow path 32 extends first along the outer wall 20 (see arrow 50a) and then along the radially extending wall 24 (see arrow 50b) and finally along the inner wall 22 (see arrow 50c) substantially entirely about the combustor 18. It should be noted, of course, that air will be diverted at various points along the flow path 32 such as through the orifices 40 to produce the air film on the turbine shroud 36, through the tubes 52 which form a portion of a fuel injection system that will be described hereinafter, through a plurality of circumferentially spaced orifices 54 which air impacts on and flows along the radially extending wall 24, through a plurality of circumferentially spaced orifices 56 which air impacts on and flows along the inner wall 22 and through a plurality of circumferentially spaced orifices 58. As will be appreciated, the air passing through the tubes 52 and through the orifices 54, 56 and 58 will be sufficient to complete the combustion reaction when mixed with fuel and ignited in the combustion space 28.

As for air remaining in the flow path 32 downstream of the orifices 58, it will pass through the compressed air outlet 48 for the purpose of diluting the flame to a safe temperature before entering the nozzle 16. This dilution air is swirling and, as a result, it preferably passes by circumferentially spaced vanes 60 which are arranged such that their leading edges 60a are appropriately angled to meet the swirling air smoothly with minimal loss while their trailing edges 60b are appropriately angled to provide an increased swirl for higher velocities to promote rapid radial mixing. With this arrangement, rapid mixing of hot and cold gases with minimal pressure loss is provided to achieve safe temperatures without excessive turbulence just upstream of the nozzle 16 and turbine blades 14.

Still referring to FIG. 1, means are provided for positioning the combustor 18 within the housing 30 including abutment means such as the annular stiffening ring 38 which acts between the combustor 18 and the housing 30 for maintaining them in a preselected axial relation. The abutment means or annular stiffening ring 38 is preferably provided on an inner surface of the outer wall 20 of the combustor 18 where it is adapted to contact the one of the turbine shrouds 36 furthest from the combustor 18 which has an axial engagement surface 36a extending generally perpendicular to the axis 42 of the rotor 12 to an outer edge 36b at a point radially outwardly of the nozzle 16 such that the stiffening ring 38 is adapted to axially engage the engagement surface 36a adjacent the outer edge 36b to limit relative axial movement between the combustor 18 and the housing 30. Additionally, the abutment means may further comprise the vanes 60 disposed between the one of the turbine shrouds 44 nearest the combustor 18 and the inner wall 22 of the combustor 18 adjacent the compressed air outlet 48.

As for the vanes 60, they are preferably fixed to only one of the turbine shroud 44 and the inner wall 22 of the combustor 18. Thus, they are also adapted to limit relative axial movement between the combustor 18 and the housing 30 in cooperation with the annular stiffening ring 38 which axially engages the engagement surface 36a of the turbine shroud 36. As a result, the stiffening ring 38 and vanes 60 provide a simple yet effective means of positioning the combustor 18 during operation.

More particularly, a force as represented by the arrow 62 acts on the radially extending wall 24 by reason of combustor pressure drop to move the combustor 18 forward so as to cause the stiffening ring 38 to engage the turbine shroud 36. At the same time, a somewhat smaller force as shown by the arrow 64 acts on the portion 22a of the inner wall 22 to minimize the possibility of excessive forces on any portion of the structure. With this arrangement, the force 62 is slightly greater than the force 64 thereby causing the vanes 60 to engage the turbine shroud 44 without the need for expensive radial support pins to provide accurate positioning of the combustor 18.

In addition, the positioning means also includes spacing means such as a plurality of vanes 66 disposed between the combustor 18 and the housing 30 in the dilution air flow path 32 intermediate the compressed air inlet 46 and the compressed air outlet 48. The vanes 66 are preferably disposed in circumferentially spaced relation between the inner wall 22 of the combustor 18 and the housing 30, i.e., an inner wall portion 30a of the housing 30, at an angle corresponding to an angle of swirl of air in the dilution air flow path 32. In order to accommodate the limited axial movement of the combustor 18 in the housing 30, the vanes 66 are preferably fixed to only one of the inner wall 22 of the combustor 18 and the wall portion 30a of the housing 30 to maintain concentricity therebetween.

Figure 2:
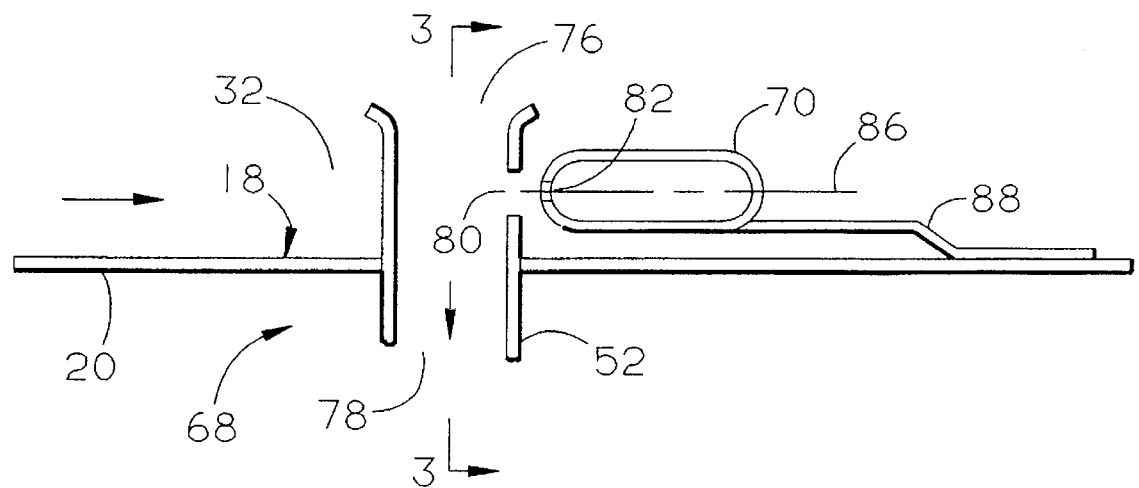
FIG. 2 is a cross sectional view of the fuel injection system taken on the line 2—2 of FIG. 1.
Figure 3:
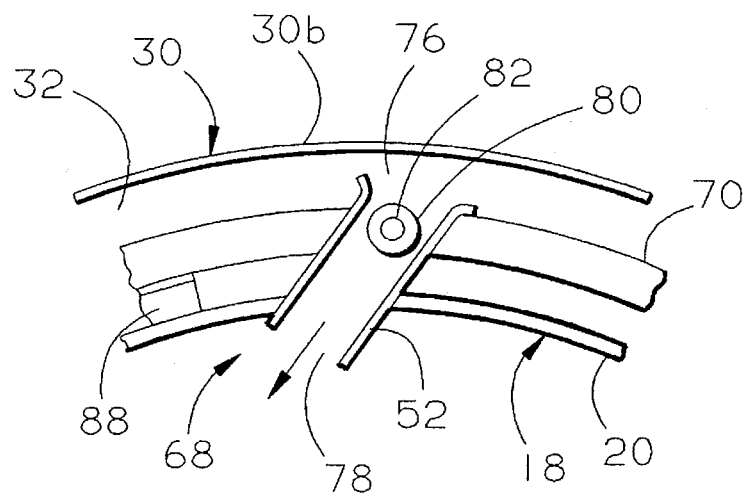
FIG. 3 is a cross sectional view of the fuel injection system taken on the line 3—3 of FIG. 2.

Referring to FIGS. 2 and 3, the fuel injection means includes a plurality of circumferentially spaced fuel injectors generally designated 68 which are disposed in the outer wall 20 of the combustor 18. It will be noted that the fuel injection means also includes a generally oval shaped manifold 70 disposed in the air flow path 32 between the outer wall 20 and the housing 30, i.e., the housing wall portion 30b. As shown in FIG. 1, the manifold 70 is in fluid communication with a primary fuel source through a fuel line 72 and the fuel injectors 68 permit fuel from the manifold 70 to be injected into the combustion space 28.

Referring once again to FIGS. 2 and 3, the fuel injectors 68 each comprise one of the tubes 52 which have an air inlet 76 at one end thereof, a fuel/air outlet 78 at the other end thereof, and a fuel inlet 80 intermediate the air inlet 76 and fuel/air outlet 78. The air inlets 76 are each in fluid communication with the air flow path 32 between the outer wall 20 of the combustor 18 and the housing wall portion 30b of the housing 30 with the fuel/air outlets 78 each being in fluid communication with the combustion space 28. With the tubes 52 preferably being generally cylindrical in shape, the air inlet 76 and fuel/air outlet 78 of each of the tubes 52 are axially spaced at opposite ends with the fuel inlet 80 comprising a radial opening in the tube 52.

More specifically, the radial opening 80 in each of the tubes 52 is in fluid communication with a fuel metering orifice 82 in the manifold 70 to receive a radially projecting jet of fuel from the primary fuel source. The tubes 52 are each disposed at an acute angle to the outer wall 20 so as to inject a mixture of the fuel and air into the combustor 18 to create a circumferential flow in the combustion space 28 as represented by the arrow 84. With the manifold 70 having a major axis 86 extending generally parallel to the air flow path 32, the fuel inlets 80 are each in fluid communication with a corresponding fuel metering orifice 82 on the major axis 86.

As shown in FIG. 2, the manifold 70 is supported in this position, i.e., a position wherein the fuel inlets are in communication with the metering orifices, in spaced relation to the outer wall 20 of the combustor 18 and the housing wall portion 30b of the housing 30 by a plurality of standoffs such as 88.

With the arrangement described, the orifices 40 through the outer wall 20 and stiffening ring 38 provide a cooling film of air on the surface 36a of the turbine shroud 36. This air constitutes a substantial portion of the total air flow and may, e.g., be as high as ten percent of the total air flow. Because of the aerodynamics of swirl flow, together with temperature gradients, a stable air film is assured that will provide cooling of the rotor 12.

Because of the unique arrangement of the tubes 52, air can enter at the air inlet 76 to atomize and mix fuel circumferentially in a thorough manner about the combustor 18 in an inexpensive fashion. The manifold 70, because of its oval shape, provides a minimal flow obstruction to air in the air flow path 32 while at the same time providing an adequate flow area for fuel so that fuel pressure drop can be minimized while providing a good fuel distribution to the tubes 52 through the fuel metering orifices 82. As will be appreciated, the fuel metering orifices 82 provide good fuel distribution in cooperation with the fuel injectors 68 in a simple and inexpensive manner.

Moreover, the standoffs 88 are provided at circumferentially spaced locations about the outer wall 20 where they serve to accurately locate the manifold 70. At the same time, they prevent damaging thermal gradients between the manifold 70 and the hot outer wall 20. Furthermore, this arrangement results in the absence of any joints or fittings in the manifold 70 to thereby reduce the expense and increase the life in a highly desirable manner.

While not shown in FIG. 1, it will be appreciated that an igniter will be provided in the flame zone for purposes of ignition. The igniter may typically be positioned in the radially extending wall 24. Depending upon requirements, the igniter may be a pyrotechnic for one shot applications or a spark igniter when the engine is to perform many starts.

Still referring to FIG. 1, it will be appreciated that when the stiffening ring 38 contacts the engagement surface 36a of the turbine shroud 36 the vanes 60 will be in contact with the inner wall portion 22a and the turbine shroud 44. This provides a very simple means of axial location of the combustor 18 within the housing 30 without the need for permanent fasteners which thereby reduces expense and weight while accommodating a reduction in the overall diameter of the engine. In addition, by utilizing the vanes 66, the combustor 18 is easily maintained in generally concentric relation to the housing 30.

While in the foregoing there has been set forth a preferred embodiment of the invention, it will be appreciated that the details herein given may be varied by those skilled in the art without departing from the true scope of the appended claims.

We claim:

1. A gas turbine engine, comprising:

a rotor including turbine blades and a nozzle adjacent said turbine blades for directing hot gases of combustion at said turbine blades;

an annular combustor about said rotor defined by spaced inner and outer walls connected by a radially extending wall, said combustor having an outlet leading to said nozzle, said combustor including an annular combustion space upstream of said outlet defined by said inner, outer and radially extending walls;

an annular combustor housing substantially surrounding said combustor in generally concentric spaced relation to said inner, outer and radially extending walls thereof to define an air flow path therebetween;

fuel injection means operatively associated with said combustor for injecting fuel from a primary fuel source into said combustion space;

said air flow path being in fluid communication with a compressor and with said combustor to permit air from said compressor to be injected into said combustion space;

said combustor being adapted to combust fuel from said primary fuel source and air from said compressor to generate said hot gases of combustion; and a turbine shroud extending radially outward from said rotor and connected to said outer wall of said combustor on the side of said nozzle opposite said combustion space;

a plurality of circumferentially spaced orifices positioned to direct a film of air onto said turbine shroud at a location not upstream from said outlet.

2. The gas turbine engine as defined in claim 1 wherein said outer wall of said combustor includes a stiffening ring adjacent said turbine shroud, said plurality of spaced orifices extending through said outer wall and said stiffening ring to allow air to flow therethrough.

3. The gas turbine engine as defined in claim 1 wherein said turbine shroud is disposed in a plane extending perpendicular to an axis of said rotor, said plurality of spaced orifices being disposed axially adjacent said turbine shroud and radially outwardly of said nozzle.

* * * * *